Sept. 23, 1958  R. D. LEONI  2,853,141
ROTOR HEAD
Filed May 5, 1955

INVENTOR
RAY D. LEONI
BY M. B. Tasker
ATTORNEY

United States Patent Office 2,853,141
Patented Sept. 23, 1958

2,853,141

ROTOR HEAD

Ray D. Leoni, Hamden, Conn., assignor to United Aircraft Corporation, East Hartford, Conn., a corporation of Delaware Application May 5, 1955, Serial No. 506,180

6 Claims. (Cl. 170—160.55)

This invention relates to rotary wing aircraft and has as one of its objects the provision of an improved rotor for such aircraft.

More specifically, it is an object of this invention to provide a rotor in which the rotor hub is provided with a generally radial stub shaft for each blade on which the entire blade structure is journalled for pitch changing movement including the usual blade sleeve, the flapping and drag hinges and a damper for controlling movement of the blade.

Another object of this invention is to provide a rotor in which the drag hinge damper is mounted on the blade sleeve and is bodily movable therewith as the blade changes pitch.

A further object of the invention is to provide a rotor head construction in which a single damper for each blade controls the movements of the blade about its drag hinge as well as controlling flapping movements of the blade which occur when the lift of the blade is increased upon increase in blade pitch.

A still further object of this invention is generally to improve the construction and operation of rotary wing aircraft.

These and other objects and advantages of the invention will be apparent or will be pointed out in connection with the following detailed description of a specific embodiment of the invention shown in the accompanying drawings. In these drawings.

Figure 1:
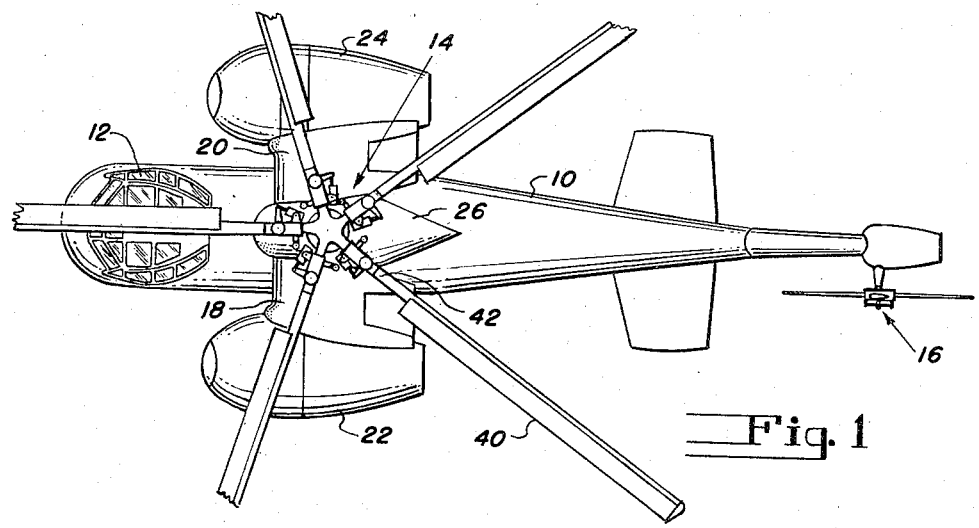
Fig. 1 is a plan view of a helicopter having a main sustaining rotor constructed in accordance with this invention, parts of the blades being broken away to facilitate illustration.

The helicopter shown in Fig. 1 includes a fuselage 10 having a pilot compartment 12, a main sustaining rotor generally indicated at 14 and a tail rotor generally indicated at 16. The fuselage is provided with short wings 18 and 20 which terminate in engine nacelles 22 and 24. The engines, not shown, drive through the wings into a usual gear box, not shown, in the main rotor pylon 26 beneath the main sustaining rotor. A rotor drive shaft 28 upstanding from the pylon 26 carries a rotor hub 30 at its upper end which is secured above a shoulder 32 on the drive shaft by upper and lower annular wedges, one of which is shown at 34 and by a spanner nut 36 which bears on washer 35 bearing against the upper wedge 34.

The main rotor as shown has five blades and hub 30 is provided with five generally radial stub shafts 38 on each of which a blade is mounted. Each blade includes a lift portion 40 (Fig. 1) having a root portion 42 which terminates inboard in a hinge part 44 of a usual blade folding hinge, the other part 46 of which is carried by a flapping link 48.

Figure 2:
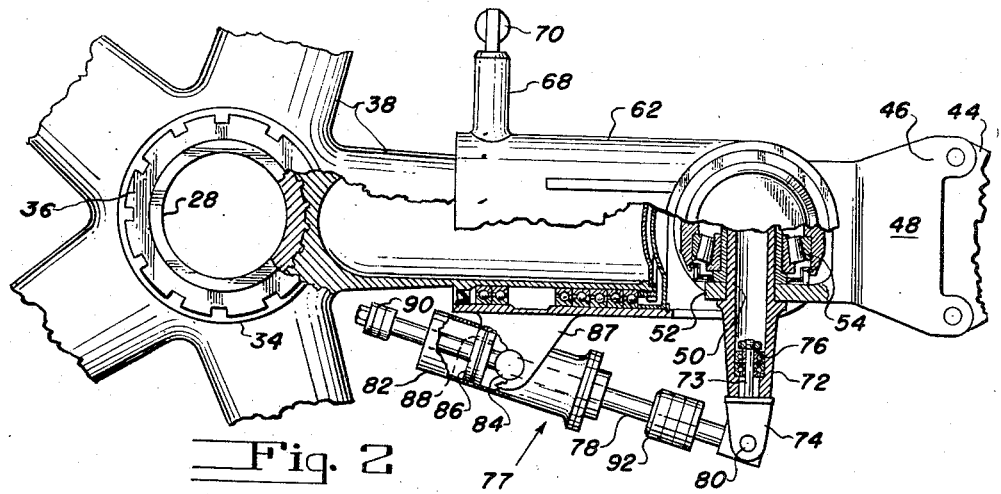
Fig. 2 is a much enlarged plan view of the rotor hub illustrating the attachment of a rotor blade, the blade itself being broken away.

The flapping link is bifurcated at its inboard end and a flapping hinge pin 50 is fixed in the furcations 52 thereof. Between the furcations the flapping pin 50 is journalled in bearings 54 carried by a drag hinge 56 which in turn has its upper and lower ends journalled in bearings 58 and 60 mounted in the outboard end of the blade sleeve 62. This sleeve is journalled for pitch changing movement of the entire blade assembly on the stub shaft 38, the usual stacked bearings 64 and 66 being provided for this purpose. Also, as shown in Fig. 2, the blade sleeve 62 has an outstanding arm 68 which is connected at 70 to the usual pitch control linkage.

The flapping hinge pin 50 has an axial extension 72 which carries a clevis 74 having a stem 73 journalled in the extension on bearings 76. A hydraulic damper 77 has its piston rod 78 connected to the clevis 74 by a pin 80. The cylinder 82 of the damper has trunnions 84 which are carried by a pair of brackets 87 formed integral with sleeve 62. The damper has a piston 86 having a fluid orifice 88 therethrough as in conventional in such dampers. The piston rod 78 extends through the inboard end of the cylinder and carries an abutment 90 which engages the cylinder for limiting the stroke of the damper in one direction. A similar abutment 92 is secured to rod 78 on the other side of the cylinder to limit the movement of the damper in the opposite direction.

In operation the blade is free to flap about the flapping hinge 50 and is free to move fore and aft in the plane of rotation about its drag hinge 56. The combined blade and damper structure is also free to move about the axis of the stub shaft 38 in pitch changing direction upon movement of the controls connected at point 70.

Figure 3:
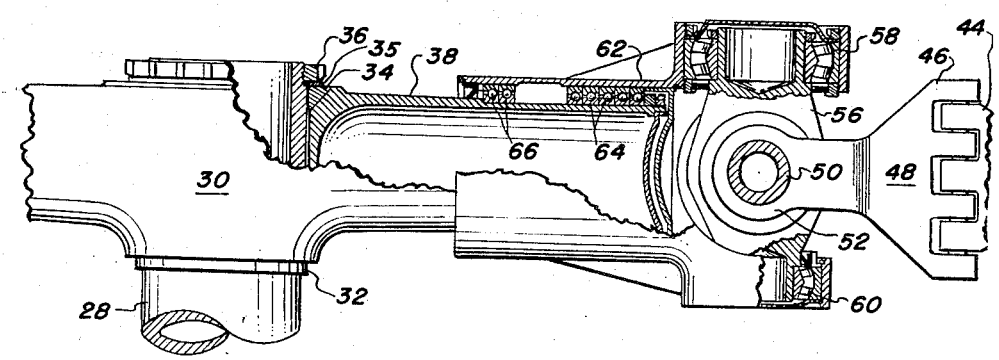
Fig. 3 is a side view of Fig. 2.

It will be evident that when the blade is at zero pitch the damper 77 will damp the lag and lead movements of the blade in its plane of rotation. Since the flapping hinge 50 lies in a plane parallel to the plane of rotation of the blade, flapping movements of the blade will be undamped when the blade is at flat pitch. Upon changing the pitch of the blade, however, since the blade flaps vertically a component of movement about the drag hinge occurs which is damped by the damper 77. This occurs since the damper 77 and flapping hinge 50 have been moved out of a horizontal plane as shown in Figs. 2 and 3. With the damper and flapping hinge in a plane at an angle to the horizontal plane, a vertical flapping movement of the blade will be damped as well as lag-lead movements. It can be seen that if the hinge part 44 of the blade, as shown in Fig. 2, were to be rotated 90° so that the damper 77 and flapping hinge 50 were in a vertical plane, then the damper 77 would provide only damping for vertical movements, i. e., movements about drag hinge 56, while lag-lead movements around flapping hinge 50 would be undamped. From a blade position of zero pitch to a definite pitch position, it can be seen that, as the blade moves between these positions, the proportion of damping provided between the lag-lead movement and flapping movement changes.

It will thus be evident that by this invention means has been provided for damping the lag-lead movements of the blade as well as the flapping movements of the blade when the latter is at any advanced pitch settings when the blade generates increased lift.

It will also be evident that this invention produces a very compact rotor hub construction and one which the damper mounting is very much simpler than the previous constructions in which the damper was connected between the flapping hinge and the rotor hub.

While only a single embodiment of the invention has been shown herein it will be understood that various changes in the construction and arrangement of the parts is possible without departing from the scope of the invention.

I claim:

1. A rotor for rotary wing aircraft including a hub having a generally radial stub shaft, a blade sleeve journalled on said shaft, a blade having means connecting it to said sleeve including flapping and drag hinges, a blade pitch changing arm on said sleeve, and means operative when said blade is at an advanced pitch for damping both the lag-lead movements of said blade and the flapping movements of said blade including a single damper having relatively fixed and movable elements, one of said elements being connected to said sleeve and the other being connected to a part of said blade structure.

2. A rotor for rotary wing aircraft incluidng a hub, a shaft extending from said hub, a blade sleeve connected to said shaft for rotation, a blade having means connecting it to said sleeve including flapping and drag hinges, and a damper, said damper having relatively movable elements, one element being connected to said sleeve and the other element being connected to a part of said blade which moves about said drag hinge.

3. A rotor for rotary wing aircraft including a hub, a shaft extending from said hub, a blade sleeve connected to said shaft for rotation, a blade having means connecting it to said sleeve including flapping and drag hinges, means for rotating said blade sleeve and connected hinges and changing the pitch angle of said blade between a minimum pitch angle and maximum pitch angle, means including a damper connected between said sleeve and said blade operative when said blade is between 0° and 90° pitch angles for damping movements of the blade in lagging and leading and in flapping.

4. A rotor for rotary wing aircraft including a hub, a shaft extending from said hub having a first bearing surface, a blade sleeve having a second bearing surface, said second bearing surface being juxtapositioned with said first bearing surface, means mounting said first and second bearing surfaces for relative rotative movement, a blade having means connecting it to said sleeve including flapping and drag hinges, means for rotating said blade sleeve and changing the pitch of said blade, and a damper, said damper having relatively movable elements, one element being connected to said sleeve and the other element being connected to a part of said blade which moves about said drag hinge.

5. A rotor for rotary wing aircraft including a hub having a shaft for supporting a rotor blade, a blade sleeve journalled to said shaft for rotation, a first hinge journalled in said sleeve having an axis, a second hinge journalled in said first hinge at an angle to said first hinge having an axis, a blade, said blade being attached to said second hinge, a damper having cylinder and piston elements, said damper having a longitudinal axis, means connecting one element to said sleeve, means connecting the other element to said blade, and means for changing the pitch of said blade, said damper axis and said second hinge axis being maintained in a fixed relationship in all pitch positions of said blade about said shaft.

6. A rotor for rotary wing aircraft including a hub having a shaft for supporting a rotor blade, a blade sleeve journalled to said shaft for pitch changing movements, a drag hinge journalled in said sleeve, a flapping hinge journalled in said drag hinge, a blade, said blade being attached to said flapping hinge, said flapping hinge having an axial extension, a damper having relatively movable elements, means operatively connecting one element to said sleeve, and means operatively connecting the other element to said axial extension.

References Cited in the file of this patent

UNITED STATES PATENTS

| | | |
|---|---|---|
| 2,484,739 | Remmen | Oct. 11, 1949 |
| 2,568,214 | Bennett | Sept. 18, 1951 |
| 2,616,510 | Rzeczycki | Nov. 4, 1952 |
| 2,638,994 | Buivid | May 19, 1953 |